United States Patent
Desprez et al.

(10) Patent No.: US 7,940,027 B2
(45) Date of Patent: May 10, 2011

(54) BATTERY AND METHODS WITH REAL TIME CHARGE AND DISCHARGE MANAGEMENT

(75) Inventors: Philippe Desprez, Le Taillan Medoc (FR); Gerard Barrailh, Gradignan (FR); Sebastien Benjamin, Leognan (FR)

(73) Assignee: Saft Groupe SA, Bagnolet (FR)

( * ) Notice: Subject to any disclaimer, the term of this patent is extended or adjusted under 35 U.S.C. 154(b) by 782 days.

(21) Appl. No.: 11/875,575

(22) Filed: Oct. 19, 2007

(65) Prior Publication Data

US 2009/0091296 A1    Apr. 9, 2009

(30) Foreign Application Priority Data

Oct. 9, 2007  (EP) .................................. 07291228

(51) Int. Cl.
*H02J 7/00* (2006.01)
(52) U.S. Cl. ......... 320/134; 320/132; 320/149; 324/427
(58) Field of Classification Search .................. 320/134; 324/427

See application file for complete search history.

(56) References Cited

U.S. PATENT DOCUMENTS

| | | | | |
|---|---|---|---|---|
| 4,709,202 A | * | 11/1987 | Koenck et al. ................ | 320/112 |
| 5,569,999 A | * | 10/1996 | Boll et al. ..................... | 320/136 |
| 5,589,757 A | | 12/1996 | Klang | |
| 5,619,117 A | * | 4/1997 | Koenck .......................... | 320/106 |
| 5,847,912 A | * | 12/1998 | Smith et al. ................... | 361/93.1 |
| 5,990,726 A | * | 11/1999 | Bauer ............................ | 327/512 |
| 6,037,751 A | | 3/2000 | Klang | |
| 6,094,034 A | * | 7/2000 | Matsuura ....................... | 320/134 |
| 6,107,779 A | * | 8/2000 | Hara et al. ..................... | 320/132 |
| 6,353,305 B1 | * | 3/2002 | Cannon et al. ................ | 320/141 |
| 7,248,929 B2 | * | 7/2007 | Meadows et al. ............... | 607/61 |
| 2004/0212349 A1 | | 10/2004 | Tsuchiya et al. | |
| 2007/0166610 A1 | | 7/2007 | Nakashima et al. | |
| 2007/0216366 A1 | * | 9/2007 | Inamine et al. ............... | 320/132 |

FOREIGN PATENT DOCUMENTS

WO    2007016661    8/2007

OTHER PUBLICATIONS

Passerini S et al: "Lithium-ion batteries for hearing aid applications—II. Pulse discharge and safety tests" Journal of Power Sources, Elsevier, Amsterdam, NL, vol. 90, No. 2, Oct. 1, 2000, pp. 144-152, XP004213453.

* cited by examiner

*Primary Examiner* — Edward Tso
*Assistant Examiner* — Arun Williams
(74) *Attorney, Agent, or Firm* — Sughrue Mion, PLLC

(57) ABSTRACT

A method to manage charge and/or discharge of a rechargeable battery comprising at least one electrochemical cell having predetermined maximum continuous charge current (IMR_C) and/or discharge current (IMD_C) allowed, the method comprising the steps of:
  measuring an instantaneous charge current (I);
  defining an overcharge capacity (Cap);
  determining an instantaneous maximum current allowed in charge (IMR) as a function of the overcharge capacity; and/or
  defining an over thermal capacity (CapTh);
  determining an instantaneous maximum pulse current allowed in discharge (IMD_max) as a function of the over thermal capacity.

24 Claims, 6 Drawing Sheets

BATTERY AND METHODS WITH REAL TIME CHARGE AND DISCHARGE MANAGEMENT

BACKGROUND OF THE INVENTION

1. Field of the Invention

The invention relates to batteries and in particular to a method to manage charge and/or discharge of a rechargeable battery.

2. Related Background Art

Rechargeable batteries are being used in various applications. In rechargeable batteries, the chemical reactions which take place at the positive and negative electrodes in each electrochemical cell are reversible. As the electrochemical nature of battery systems differ significantly, different chargers are necessary to address the different types of battery charging needs.

Aircraft and other transportation applications typically make use of lead acid batteries in particular for starting an engine. It appears desirable to use other types of batteries in such applications instead of lead acid batteries in order to benefit from their advantages. In particular, Lithium Ion (Li-Ion) batteries are contemplated.

However, Li-Ion batteries require specific electronics to control the charge thereof especially to prevent overcharging. It has been observed that overcharging of Li-Ion batteries produces Lithium deposition on the negative electrode surface which accelerates aging of the battery. So, applications designed for working with lead acid batteries or other types of batteries are not adapted to charge safely Li-Ion batteries. In particular, the usual open circuit charge voltage of the battery charger or current-generating equipment used for lead acid batteries would overcharge a Li-Ion battery.

Typically, the maximum charging current that can be applied to a Li-Ion battery cell is limited by the maximum continuous current defined to avoid early aging of the battery. Thus, current pulses are limited by this maximum value even if a higher charging current during a very short time would not damage the electrochemical cell. When the battery is used in hybrid applications, it can be seek to store a large amount of energy during a short time but the charge controller would typically not allow a charge current higher than the maximum continuous current for the battery.

Charging of battery with current pulses has been used in low load applications such as mobile phones or desktop computers. U.S. Pat. No. 5,481,174 discloses such a method for rapidly charging a Lithium Ion cell according to a predetermined charging cycle.

U.S. Pat. No. 5,315,228 discloses a battery charge controller that calculates the state of charge dynamically for a nickel cadmium or nickel metal hydride electrochemical cell. The problem of maximum charging current is not hinted at in this document as it is specific to Lithium-Ion electrochemical cells.

U.S. Pat. No. 2006/0255766 discloses a method for managing a battery pack for hybrid or electric vehicles. Set conditions are defined. Charging can be carried out when current or voltage is within predetermined values otherwise a precharge relay is turned off and a warning signal is provided to the user. The predetermined values are defined and remain constant throughout the battery life.

U.S. Pat. No. 5,557,188 discloses a battery system with charge and discharge control. This document does not disclose how limit values are defined.

U.S. Pat. No. 7,164,256 discloses a method for determining if a requested electrical energy is available, for emergency braking for instance. A battery model and a generator model are provided to determine the total power available in the vehicle electrical system. The battery model is updated continuously depending on aging. This document is however silent on how to define the maximum charging current allowed.

None of the above mentioned prior art document discloses a battery system allowing for a charge current higher than a maximum predetermined current defined for the battery. As mentioned before, when using Lithium-Ion battery, the charge current is strictly limited due to lithium plating constraints. This limitation of the charge current reduces the charge rate and prevents fast charging of the battery.

Therefore, there is a need for a battery charge controller that would allow a temporary charge current higher than the maximum continuous current defined for the battery. There is also a need for a method to manage the charge of a battery which would determine the instantaneous maximum charge current allowed without accelerating aging of the battery.

In the same way, discharge control is typically provided with any battery system to prevent too high discharge currents that would cause over heating of the electrochemical cells.

However, notably for hybrid applications, there are situations where high currents are required over a very short time but the discharge controller would typically not allow a discharge current higher than a maximum continuous current defined for the battery. This limitation of the discharge current reduces the available power that can be provided by the battery to the application.

Thus there is also a need to provide a solution for controlling the discharge current of a Lithium-Ion battery to allow a temporary discharge current higher than the maximum continuous current defined for the battery.

SUMMARY OF THE INVENTION

The invention provides a solution for managing the charge and/or discharge of a battery by authorizing temporary current pulses and progressively reducing the allowed current to the values of the maximum continuous currents defined for the battery to avoid any damage of the battery.

In particular, the invention provides a method to manage charge of a rechargeable battery comprising at least one electrochemical cell having a predetermined maximum continuous charge current allowed for given temperature and state of charge conditions, the method comprising the steps of:

measuring an instantaneous charge current;

defining an overcharge capacity;

determining an instantaneous maximum current allowed in charge as a function of the overcharge capacity.

According to an embodiment, the overcharge capacity is defined as the time integral of the difference between the instantaneous charge current and the maximum continuous charge current: $Cap = \int (I - IMR_C) dt$ According to an embodiment, the overcharge capacity has a maximum value, for a given temperature and state of charge of the battery, defined as the overcharge capacity to allow a pulse charge current during a given time.

According to an embodiment, the instantaneous maximum current allowed in charge is decreased when the overcharge capacity becomes less than a requested value to allow decrease of the charge current to return to the maximum continuous charge current with a maximum slope.

According to an embodiment, the instantaneous maximum current allowed in charge has a maximum value defined as a function of a predetermined maximum charge voltage of the battery.

According to an embodiment, the instantaneous maximum current allowed in charge has a maximum value comprised between 1.5 to 5 times the predetermined maximum continuous charge current allowed for given temperature and state of charge conditions.

According to an embodiment, the maximum value of the instantaneous maximum current allowed in charge is reduced when the state of charge of the battery increases.

According to an embodiment, the instantaneous maximum current allowed in charge is further determined as a function of an over thermal capacity. This over thermal capacity can be defined as the time integral of the difference between the square of the instantaneous charge current and the square of the maximum continuous current allowed in discharge, $Cap\_Therm = \int (I^2 - IMR_C^2) dt$; or as the time integral of the square of the difference between the instantaneous charge current and the maximum continuous current allowed in discharge, $Cap\_Therm = \int (I - IMR_C)^2 dt$. The over thermal capacity can be a function of the battery resistance.

The invention also provides a method to manage discharge of a battery comprising at least one electrochemical cell having a predetermined maximum continuous discharge current allowed for given temperature and state of charge conditions, the method comprising the steps of:

measuring an instantaneous charge current;
defining an over thermal capacity;
determining an instantaneous maximum current allowed in discharge as a function of the over thermal capacity.

According to an embodiment, the over thermal capacity is defined as the time integral of the difference between the square of the instantaneous discharge current and the square of the maximum continuous current allowed in discharge, $CapTh = \int (I^2 - IMD_C^2) dt$ or as the time integral of the square of the difference between the instantaneous discharge current and the maximum continuous current allowed in discharge, $CapTh = \int (I - IMD_C)^2 dt$. The over thermal capacity can be a function of the battery resistance.

According to an embodiment, the over thermal capacity has a maximum value, for a given temperature and state of charge of the battery, defined as the over thermal capacity to allow a pulse discharge current during a given time.

According to an embodiment, the instantaneous maximum current allowed in discharge is decreased when the over thermal capacity becomes less than a requested value to allow decrease of the discharge current to return to the maximum continuous discharge current with a maximum slope.

According to an embodiment, the instantaneous maximum current allowed in discharge has a maximum absolute value defined as a function of a predetermined minimum discharge voltage of the battery.

According to an embodiment, the instantaneous maximum current allowed in discharge has a maximum absolute value comprised between 1.5 to 4 times the predetermined maximum continuous discharge current allowed for given temperature and state of charge conditions.

According to an embodiment, the maximum value of the instantaneous maximum current allowed in discharge is reduced when the state of charge of the battery decreases.

The invention further provides a battery charge controller comprising a memory including a program that implements the method of the invention, wherein the controller limits or provides information allowing to limit the charge current to the determined value of the maximum current allowed in charge.

The invention also provides a battery discharge controller comprising a memory including a program that implements the method of the invention, wherein the controller limits or provides information allowing to limit the discharge current to the determined value of the maximum current allowed in discharge.

The invention also provides a battery comprising at least one electrochemical cell and a charge controller and/or a discharge controller according to the invention. The battery can be a Li-Ion battery.

The invention also provides a computer readable medium comprising an algorithm implementing the method of the invention.

Additional objects, advantages and features of the various aspects of the present invention will become apparent from the following description of its preferred embodiments which is given in conjunction to the accompanying drawings, the description of these embodiments being given as non-limiting examples.

DETAILED DESCRIPTION OF THE INVENTION

Figure 1:
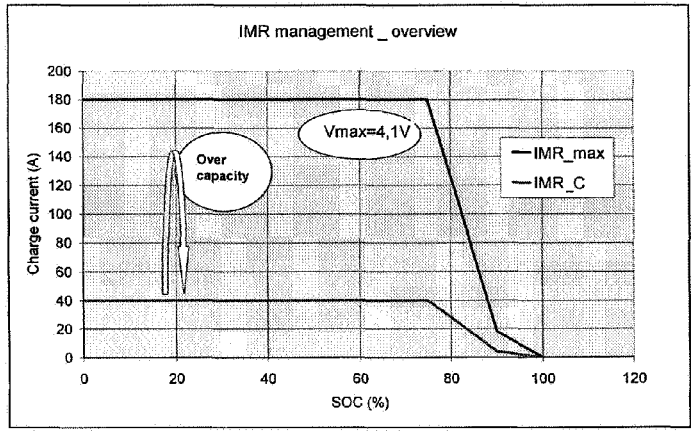
FIG. 1 shows a representation of the overcharge capacity determined according to the method of the invention.

The invention provides a method to manage charge and/or discharge of a rechargeable battery wherein the maximum authorized charge or discharge current is determined at every moment depending on the instantaneous current measured constantly. The limit values for the charge and discharge current are therefore dynamically determined at every moment. This method allows for temporary high currents to be applied or supplied. The method of the invention can be implemented in an algorithm stored on a computer readable medium.

The battery is provided with parameters that depend on the electrochemical nature of the cells and on its dimensions.

The parameters, all defined as positives, comprise the following:

$IMD\_C$: maximum continuous current allowed in discharge (A);

$IMD\_max$: maximum pulse current allowed in discharge (A);

$IMD\_nom$: root mean square current allowed in continuous solicitation in discharge (A);

$CapTh\_max$: maximum allowed over thermal capacity ($A^2 \ast s$);

$IMR\_C$: maximum continuous current allowed in charge (A);

$IMR\_max$: maximum pulse current allowed in charge (A);

$IM\_therm\_init$: initial value of the maximum current allowed due to thermal effect (A);

IM_therm_nom: root mean square current allowed in continuous solicitation in charge (A);

Cap_max: maximum allowed over charge capacity to allow pulses (A*s);

Islope: maximum current slope allowed by the application for charge and discharge (A/s);

IMD_soc: Factor of reduction of IMD for low state of charge;

IMR_soc: Factor of reduction of IMR for high state of charge;

Vmin=Seuil_min1: minimum discharge voltage allowed (V);

Vmin=Seuil_min2: hysteresis for discharge voltage control (V)

Vmax=Seuil_max1: maximum charge voltage allowed (V);

Vmax=Seuil_max2: hysteresis for charge voltage control (V)

The invention proposes a method to determine a maximum current allowed in charge IMR and a maximum current allowed in discharge IMD at every moment in time. To provide these instantaneous maximum allowed current values, variables are further measured or determined:

I: instantaneous current which flow through the battery or cell (A); I>0 in charge and I<0 in discharge;

SOC: battery or cell State Of Charge (%)

T: battery or cell temperature (° C.)

V: battery or cell voltage (V)

The description will be made first with respect to charge management.

The invention proposes a method to determine a maximum current allowed in charge IMR that can be higher than the above defined parameter of continuous current allowed in charge IMR_C.

The maximum current allowed in charge IMR is determined at every moment as a function of the measured current I that flows through the battery at that precise moment and as a function of an overcharge capacity Cap. Whenever the instantaneous charge current I is less than the maximum continuous current allowed in charge IMR_C, the overcharge capacity Cap is filled and whenever the instantaneous charge current I is higher than the continuous current allowed in charge IMR_C, the overcharge capacity Cap is emptied. When the overcharge capacity is totally emptied, the maximum current allowed in charge IMR is equal to the maximal continuous current allowed in charge IMR_C. Therefore, the overcharge capacity Cap determines the additional charge current that can be applied to the battery.

The overcharge capacity Cap is expressed in Coulomb—or Ampere Seconds (A*s)—and represents a quantity of electricity that can be transported; it can be defined according to the following relation:

$$Cap = \int (I - IMR\_C) dt$$

Of course, the overcharge capacity Cap is not limited to this relation; notably, a multiplying factor can be added to the above defined relation.

FIG. 1 shows a representation of the overcharge capacity as a function of the SOC and for a given value of maximum charge voltage Vmax and for a given temperature.

This overcharge capacity is evaluated dynamically with a time period S that can be chosen depending on the application:

$$Cap_{t+s} = Cap_t - S^*(I - IMR\_C)$$

The overcharge capacity can not be unlimited. As explained above, for a Lithium-Ion battery, the limitation of charge current is defined to avoid lithium plating. The overcharge capacity must therefore be limited.

For instance, the maximum allowed overcharge capacity could be defined, for a given temperature, as the overcharge capacity to allow a pulse charge current during a given time without causing premature aging, i.e. aging superior to the expected aging caused by a continuous charge. The maximal overcharge capacity can be defined according to the following relation:

$$Cap\_max = (I_{pulse} - IMR\_C)^*(pulse\_duration)$$

Because lithium plating has no theoretical precise study, applicant has experienced that the overcharge capacity could be limited to a 10 seconds pulse charge current with a pulse current being one and a half to five times the value of the predetermined maximum continuous charge current (IMR_C) allowed for given temperature and state of charge conditions (e.g.: pulse_duration=10 s; $I_{pulse}$=4*IMR_C). Of course, this value of Cap_max could be defined with respect to a charge current pulse of less or more than 10 seconds and of different intensity of $I_{pulse}$ depending on the battery type and applications.

The overcharge capacity should also be limited to ensure that there is always enough overcharge capacity to decrease at a maximum rate from the instantaneous allowed charge current IMR to the maximum continuous charge current IMR_C to avoid brutal current decrease when the overcharge reservoir empties.

This requested overcharge capacity can be defined according to the following relation:

$$Cap\_req = (IMR - IMR\_C)^2 / 2^* Islope$$

For instance, applicant has experienced that a decreasing current slope Islope equal to 10 A/s is appropriate for 10 to 200 kW hybrid applications. The decreasing current slope can be steeper when voltage limits are reached.

The pulse current allowed in charge can also be limited to a predetermined value IMR_max, which can be equal to $I_{pulse}$ for example. Thus the charge controller will not provide more than a value of $I_{pulse}$ during a given time pulse_duration which is necessary to ensure battery lifetime. IMR_max can also ensure that the maximum charge voltage Vmax of the battery remains less than a predetermined value whatever the reserve in the overcharge capacity is.

Vmax can be higher than the voltage of the fully charged battery state. If the end of charge battery voltage is 4,0V, the maximum pulse current allowed in charge IMR_max could be limited to guarantee a charge voltage maximum Vmax of 4,1V for example. Overcharge will be avoided by IMR being a function of the state of charge (SOC) of the battery. This function defines a zero current for a state of charge of 100%, that is to say an open circuit voltage of 4.0V. The higher value of Vmax compared to the battery end of charge voltage allows to increase the charge current and power.

It should be noted that the value of the maximum continuous charge current depends on temperature, as this is well known from the skilled person. The value of the maximum continuous charge current also depends on the state of charge (SOC) of the battery, as this is well known from the skilled person.

Thus, the maximum continuous charge current integrated in the algorithm IMR_C, the maximum pulse current allowed in charge IMR_max, the maximum overcharge capacity Cap_max and the requested overcharge capacity Cap_req can also depend on temperature T and on the state of charge of the battery SOC. IMR_max, Vmax and Cap_max are parameters of the battery, i.e. they are determined depending on the battery type. They can remain constant throughout the battery life time for given temperature and SOC conditions or be adjusted with the battery aging.

Figure 2:
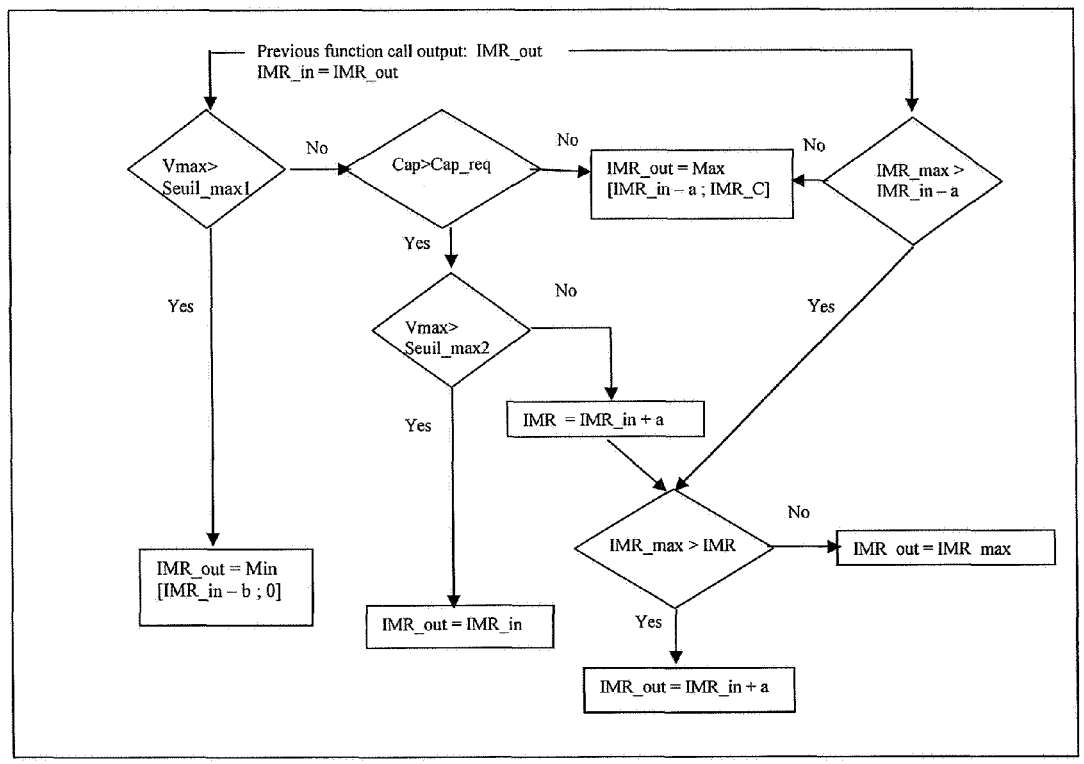
FIG. 2 shows a flowchart of the battery charge management according to a first embodiment of the method of the invention.

The method of the invention proposes to determine the instantaneous maximum current allowed in charge IMR. The flow chart of FIG. 2 illustrates the calculation of this dynamic value of authorized charge current. This instantaneous maximum current allowed in charge IMR is calculated by an algorithm implemented in a charge controller associated with the battery or with each cell.

IMR_in is the maximum current allowed in charge calculated during a previous function call. IMR_out is the instantaneous maximum current allowed determined according to the method of the invention.

At each function call, two values of current variations a and b are calculated as follow:

$$a = S*Islope;$$

$$b = S*Islope\_V$$

with S the time period between two function calls, Islope the maximum current slope allowed by the application for charge and Islope_V the maximum current slope allowed when voltage limits are reached. The period S is chosen when implementing the algorithm depending on the computing power of the controller and on the desired accuracy of the results. Islope and Islope_V are constant parameter of the battery. S can be chosen equal to 100 ms.

The algorithm checks that the maximum charge voltage Vmax of the battery is respected. If the measured charge voltage V is more than a maximum allowed value Seuil_max1, the maximum current allowed in charge is decreased:

IMR_out=IMR_in-b.

This decrease under the maximum charge voltage Vmax conditions is repeated until the voltage becomes lower than Seuil_max2 which corresponds to a current equal to 0 for a 100% SOC.

The algorithm also checks that the overcharge capacity Cap is more than the requested capacity Cap_req to avoid brutal current decrease. If it is not, the maximum current allowed in charge is decreased:

IMR_out1=IMR_in-a.

This decrease under the requested capacity Cap_req conditions is, in more drastic condition, repeated until the current returns to the maximum continuous charge current IMR_C.

Otherwise, if the measured charge voltage V is also less than an hysteresis value for charge voltage control Seuil_max2, the maximum current allowed in charge can be increased:

$$IMR\_out1 = IMR\_in + a;$$

otherwise it remains the same IMR_out1=IMR_in.

Whatever the reserve in the overcharge capacity is, the maximum current allowed in charge IMR is limited to a maximum predetermined value of IMR_max.

Figure 3:
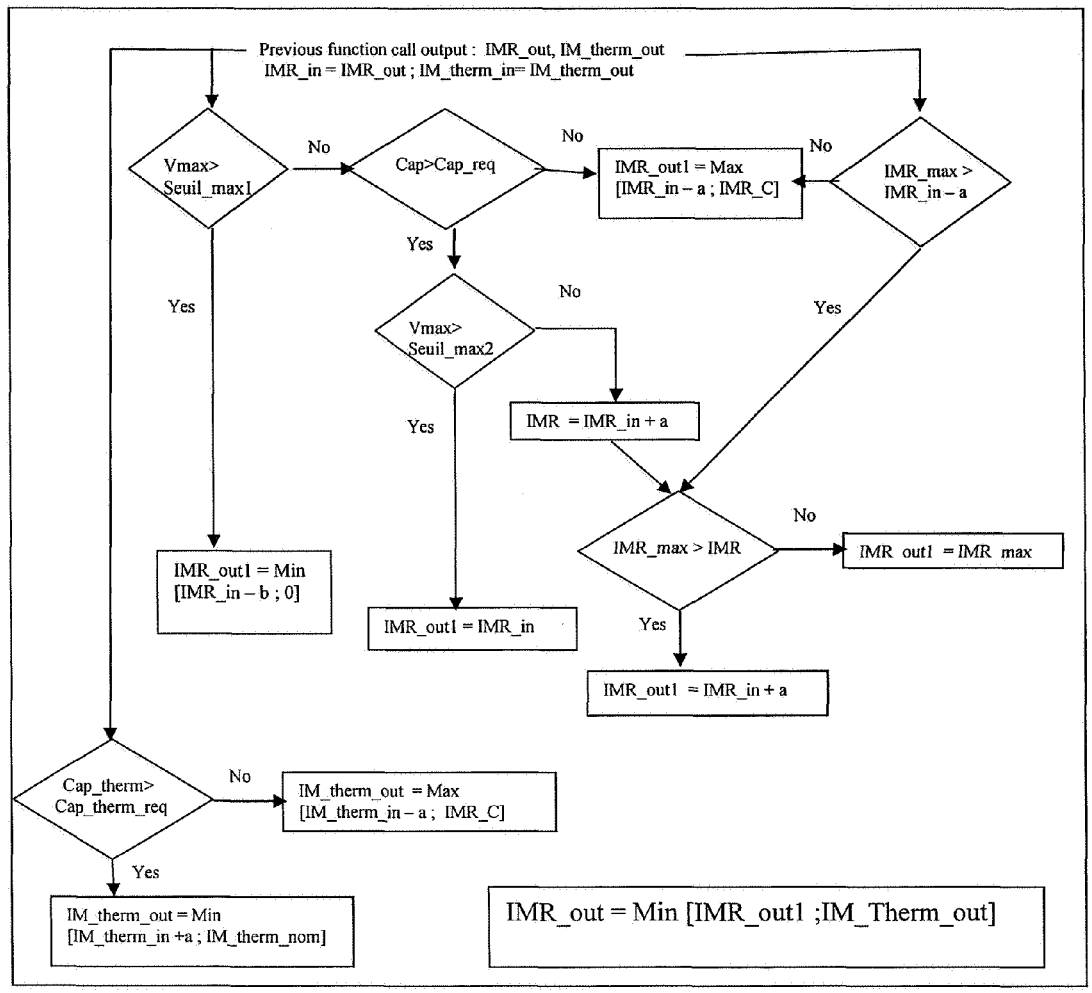
FIG. 3 shows a flowchart of the battery charge management according to a second embodiment of the method of the invention.

The flow chart of FIG. 3 illustrates a variant embodiment of the flow chart of FIG. 2 wherein the maximum current allowed in charge IMR is also a limited by thermal effects represented by a variable IM_therm which is decreased when the pulse charge current lasts in time.

The thermal effects limitation IM_therm can also be determined at every moment as a function of the measured current I that flows through the battery at that precise moment and as a function of an over thermal capacity Cap_Therm. Whenever the application requests instantaneous charge current I that is less than the root mean square current allowed in continuous solicitation IM_therm_nom in charge, the over thermal capacity Cap_Therm is filled and whenever the instantaneous charge current I is higher than the root mean square current allowed in continuous solicitation IM_therm nom, the over thermal capacity Cap_Therm is emptied. When the over thermal capacity is totally emptied, the maximum current allowed in discharge IMR is equal to or lower than the root mean square current allowed in continuous solicitation IM_therm_nom. Therefore, the over thermal capacity Cap_Therm determines the charge current that can be applied to the battery without over heating of the electrochemical cells connectors for example.

This over thermal capacity Cap_Therm is similar to the over thermal capacity CapTh defined with respect to the maximum current allowed in discharge IMD described below. This over thermal capacity Cap_Therm is expressed in Joules—or square Ampere Seconds ($A^2*s$)—and represents a quantity of electrical energy; it can be defined according to one of the following relations:

$$Cap\_Therm = \int (I^2 - IMR_C^2) dt \text{ or}$$

$$Cap\_Therm = \int (I - IMR_C)^2 dt$$

Of course, the over thermal capacity Cap_Therm is not limited to these relations; notably, a multiplying factor can be added to the above defined relations. For instance, the over thermal capacity Cap_Therm could be defined according to one of the above expressions multiplied by the battery resistance.

As can be seen from the flowchart in FIG. 3, if the charge voltage conditions are respected, the function call of the algorithm implementing the present invention provides two values of maximum current allowed in charge: IM_therm_out and IMR_out1. The instantaneous maximum current allowed in charge IMR_out is the minimum of these two calculated values.

The method of the invention provides an instantaneous value of authorized maximum charge current IMR that can be much higher than the continuous current allowed in charge for a given battery system without damaging the electrochemical cells. Fast charging can be achieved without any Lithium plating and without overheating the battery cells.

Figure 6:
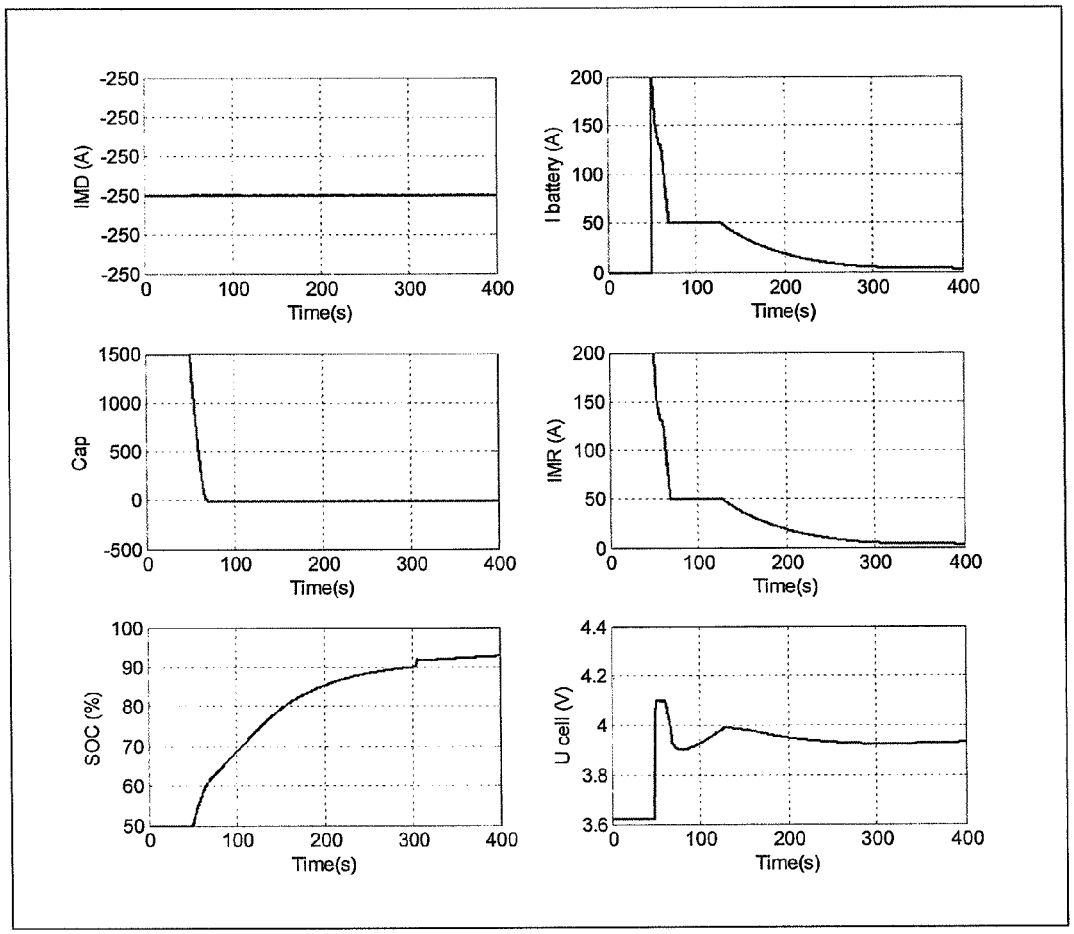
FIG. 6 shows behavior curves of a battery according to the invention during charging.

For instance, the graphs of FIG. 6 show that the charge current IMR can reach 200 A whereas the continuous current allowed in charge is 50 A. The curves of FIG. 6 were simulated from a 6 cells Li-Ion battery referenced VL6P manufactured by the applicant.

The following values were set for the battery parameters:
IMR_C=50 A at 50° C.;
IMR_max=200 A at 50° C.;
Cap_max=1500 A*s at 50° C.;
IM_therm_init=250 A
Islope=10 A/s
Islope_V=20 A/s;
IMR_soc=1 for SOC up to 75%;
IMR_soc=0,1 for SOC of 90%;
IMR_soc=0 for SOC of 100%
Seuil_max1=4,1V;
Seuil_max2=4,08V.

As can be seen from graphs of FIG. 6, when the charge current is nil (first 50 s), the overcharge capacity Cap fills in and the maximum current allowed in charge IMR is equal to the maximum value of 200 A. A pulse charge current of 200 A can thus be applied to the battery. When such a pulse current is applied, the overcharge capacity Cap decreases and after 70 s it is emptied. The maximum current allowed in charge IMR then becomes equal to the maximum continuous charge current IMR_C allowed for this battery which is 50 A. After 130 s, the maximum current allowed in charge IMR is further decreased due to a state of charge SOC superior to 75% which decreases the parameters IMR_C and IMR_max accordingly. The voltage cell was limited to 4,1V and the maximum current allowed in discharge IMD was set to 250 A without any impact on the charge simulation.

The description will now be made with respect to discharge management.

The invention proposes a method to determine a maximum current allowed in discharge IMD that can be higher than the above defined parameter of continuous current allowed in discharge IMD_C.

Just as the maximum current allowed in charge, the maximum current allowed in discharge IMD can be determined at every moment as a function of the measured current I supplied by the battery at that precise moment and as a function of an over thermal capacity CapTh. Whenever the application requests instantaneous discharge current I that is less than the maximum continuous current allowed in discharge IMD_C, the over thermal capacity CapTh is filled and whenever the instantaneous discharge current I is higher than the continuous current allowed in discharge IMD_C, the over thermal capacity CapTh is emptied. When the over thermal capacity is totally emptied, the maximum current allowed in discharge IMD is equal to the maximal continuous current allowed in discharge IMD_C. Therefore, the over thermal capacity CapTh determines the additional discharge current that can be supplied by the battery.

The over thermal capacity CapTh is expressed in Joules— or square Ampere Seconds ($A^2 \ast s$)—and represents a quantity of electrical energy; it can be defined according to one of the following relations:

$$CapTh = \int (I^2 - IMD^2\_C)dt \text{ or}$$

$$CapTh = \int (I - IMD\_C)^2 dt$$

Of course, the over thermal capacity CapTh is not limited to these relations; notably, a multiplying factor can be added to the above defined relations. The over thermal capacity CapTh could also be defined taking into account the cell internal resistance. For instance, the over thermal capacity CapTh could be defined according to one of the above expressions multiplied by the battery resistance.

Figure 4:
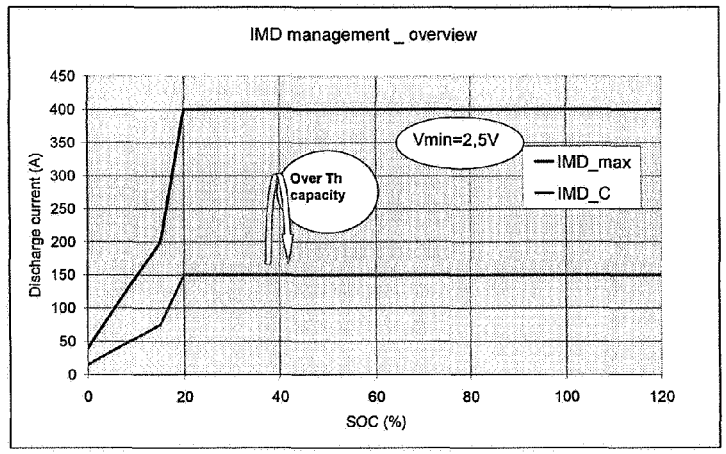
FIG. 4 shows a representation of the over thermal capacity determined according to the method of the invention.

FIG. 4 shows a representation of the overcharge capacity as a function of the SOC and for a given value of minimum discharge voltage Vmin.

This over thermal capacity is evaluated dynamically with a time period S that can be chosen depending on the application:

$$CapTh_{t+s} = CapTh_t - S \ast [(abs(I) - IMD\text{-}C)^2]$$

With abs(I), the absolute value of the measured current I supplied by the battery, I being negative in discharge according to conventional definitions.

The over thermal capacity can not be unlimited. As explained above, the limitation of discharge current is needed to avoid over heating of the electrochemical cells connectors. Typically, the over heat limitation is based on an inner cell connector temperature increase of 30° C.; so that for an ambient temperature of 40° C., the internal connector temperature should remain less than 70° C. In case of over heating, the local high temperature can damage the separator and create short-circuit inside the cell. The over thermal capacity must therefore be limited.

The maximum allowed over thermal capacity is defined to manage transient solicitation higher than the continuous allowed current IMD_C. The maximal over thermal capacity can be defined according to the following relation:

$$CapTh\_max = (I_{pulse} - IMD\_nom)^2 \ast (\text{pulse duration})$$

Depending on the battery type, the pulse duration to determine this maximum over thermal capacity can be 5 seconds, 10 seconds or 18 seconds or any other appropriate value. The discharge pulse current $I_{pulse}$ can be one and a half to four times the value of the predetermined maximum continuous discharge current IMD_C allowed for given temperature and state of charge conditions. The maximum over thermal capacity CapTh_max could also be defined taking into account the cell internal resistance.

The over thermal capacity should also be limited to ensure that there is always enough over thermal capacity to decrease at a maximum rate from the instantaneous allowed discharge current IMD to the maximum continuous charge current IMD_C to avoid brutal current decrease when the over thermal reservoir empties.

This requested over thermal capacity can be defined according to the following relation:

$$CapTh\_req = (IMD - IMD\_C)^3 / 3 \ast Islope$$

For instance, applicant has experienced that a decreasing current slope Islope equal to 10 A/s is appropriate. The decreasing current slope can be steeper when voltage limits are reached.

The pulse current allowed in discharge can also be limited IMD_max, to a value equal to Ipulse for example. Thus the discharge controller will not provide more than a value of Ipulse during a given time pulse-duration which is necessary to ensure battery lifetime. IMD_max can also ensure that the minimum discharge voltage Vmin of the battery remains higher than a predetermined value whatever the reserve in the over thermal capacity is. Vmin can be lower than the minimum voltage in continuous discharge as it does not over discharge the battery.

It should be noted that the value of the maximum continuous discharge current IMD_C can depends on temperature and state of charge (SOC) of the battery. Thus, the maximum pulse current allowed in discharge IMD_max, the maximum over thermal capacity CapTh_max and the requested over thermal capacity CapTh-req can also depend on temperature T and on the state of charge of the battery. IMD_max, Vmin and CapTh_max are parameters of the battery, i.e. they are determined depending on the battery type and can remain constant throughout the battery life time for given temperature and SOC conditions.

Figure 5:
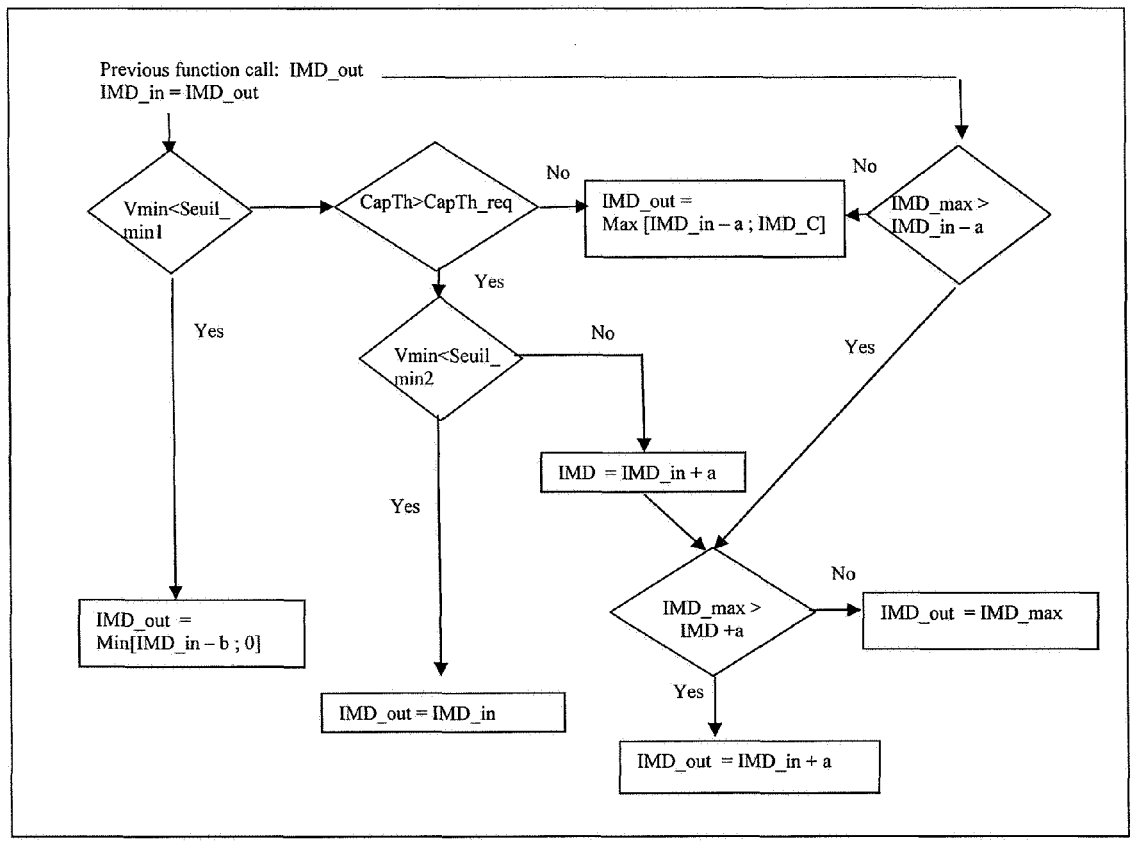
FIG. 5 shows a flowchart of the battery discharge management according to the method of the invention.

The method of the invention proposes to determine the instantaneous maximum current allowed in discharge IMD. The flow chart of FIG. 5 illustrates the calculation of this dynamic value of authorized discharge current. This instantaneous maximum current allowed in discharge IMD is calculated by an algorithm implemented in a discharge controller associated with the battery or with each cell. The discharge controller could be the same component as the charge controller or different.

IMD_in is the maximum current allowed in discharge calculated during a previous function call. IMD_out is the instantaneous maximum current allowed determined according to the method of the invention.

At each function call, two values of current variations a and b are calculated as defined with respect to charge control:

$$a = S \ast Islope;$$

$$b = S \ast Islope\_V$$

The algorithm checks that the minimum discharge voltage Vmin of the battery is respected. If the measured battery voltage V is less than a minimum allowed value Seuil_min1, the maximum current allowed in discharge is decreased:

$$IMD\_out=IMD\_in-b.$$

This decrease under the minimum discharge voltage Vmin conditions is repeated until the voltage becomes higher than Seuil_min2 which corresponds to 0 for a 0% SOC battery.

The algorithm also checks that the over thermal capacity CapTh is more than the requested capacity CapTh_req to avoid brutal current decrease. If it is not, the maximum current allowed in discharge is decreased:

$$IMD\_out1=IMD\_in-a.$$

This decrease under the requested capacity CapTh_req conditions is, in more drastic condition, repeated until the current returns to the maximum continuous discharge current IMD_C.

Otherwise, if the measured voltage V is also more than an hysteresis value for discharge voltage control Seuil_min2, the maximum current allowed in discharge can be increased:

$$IMD\_out1=IMD\_in+a;$$

otherwise it remains the same IMD_out1=IMD_in.

Whatever the reserve in the over thermal capacity is, the maximum current allowed in discharge IMD is limited to a maximum predetermined value of IMD_max.

If the voltage conditions are respected, the function call of the algorithm implementing the present invention will set the instantaneous maximum current allowed in discharge IMD_out to the maximum value between the calculated value IMD_out1 and the maximum continuous current allowed in discharge IMD_C.

The method of the invention provides an instantaneous value of authorized maximum discharge current IMD that can be much higher (in absolute value) than the continuous current allowed in discharge for a given battery system without damaging the electrochemical cells by overheating. High power can therefore be provided to the application when requested on a short period of time without the risk of causing short-circuits inside the electrochemical cells.

Figure 7:
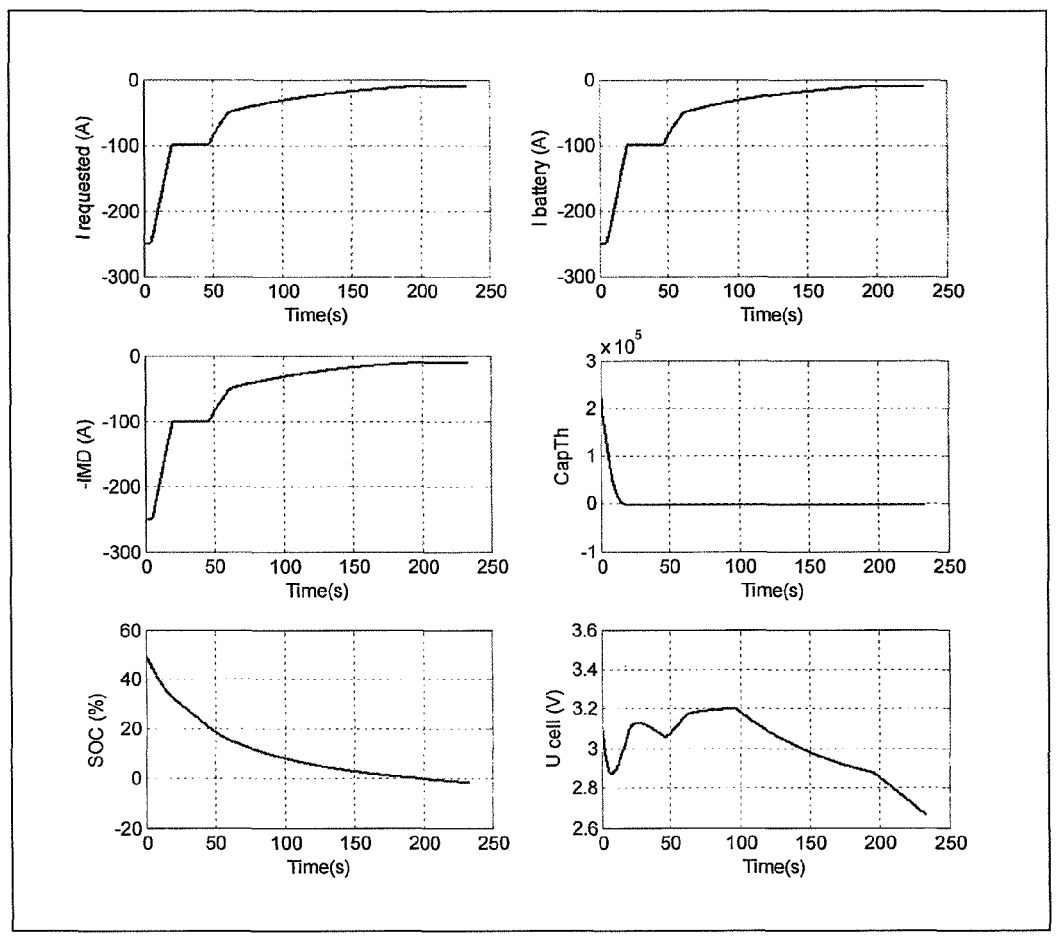
FIG. 7 shows behavior curves of a battery according to the invention during discharging.

For instance, the graphs of FIG. 7 show that the discharge current IMD can reach 250 A whereas the continuous current allowed in discharge is −100 A.

The curves of FIG. 7 were simulated from a 6 cells Li-Ion battery referenced VL6P manufactured by the applicant.

The following values were set to the battery parameters (current values are given in absolute values):
IMD_C=100 A at 50° C.;
IMD_max=250 A at 50° C.;
IMD_nom=100 A at 5° C.;
CapTh_max=225000 $A^2*s$;
IM_therm_init=250 A;
Islope=10 A/s
Islope_V=20 A/s;
IMD_soc=0,1 for SOC equal to 0% IMD_soc=0,5 for SOC equal to 15% IMD_soc=1 for SOC above 20%;
Seuil_min1=2,5V;
Seuil_min2=2,55V As can be seen from graphs of FIG. 7, the maximum current allowed in discharge IMD is initially equal to the maximum pulse current IMD_max, i.e. −250 A. The over thermal capacity CapTh therefore decreases and after about 20 s it is emptied; the maximum current allowed in discharge IMD then becomes equal to the maximum continuous discharge current IMD_C allowed for this battery which is −100 A. After 50 s, the maximum current allowed in discharge IMD is further decreased due to a state of charge SOC inferior to 20% which decreases the parameters IMD_C and IMD_max accordingly. The voltage cell was kept above 2,5V.

Figure 8:
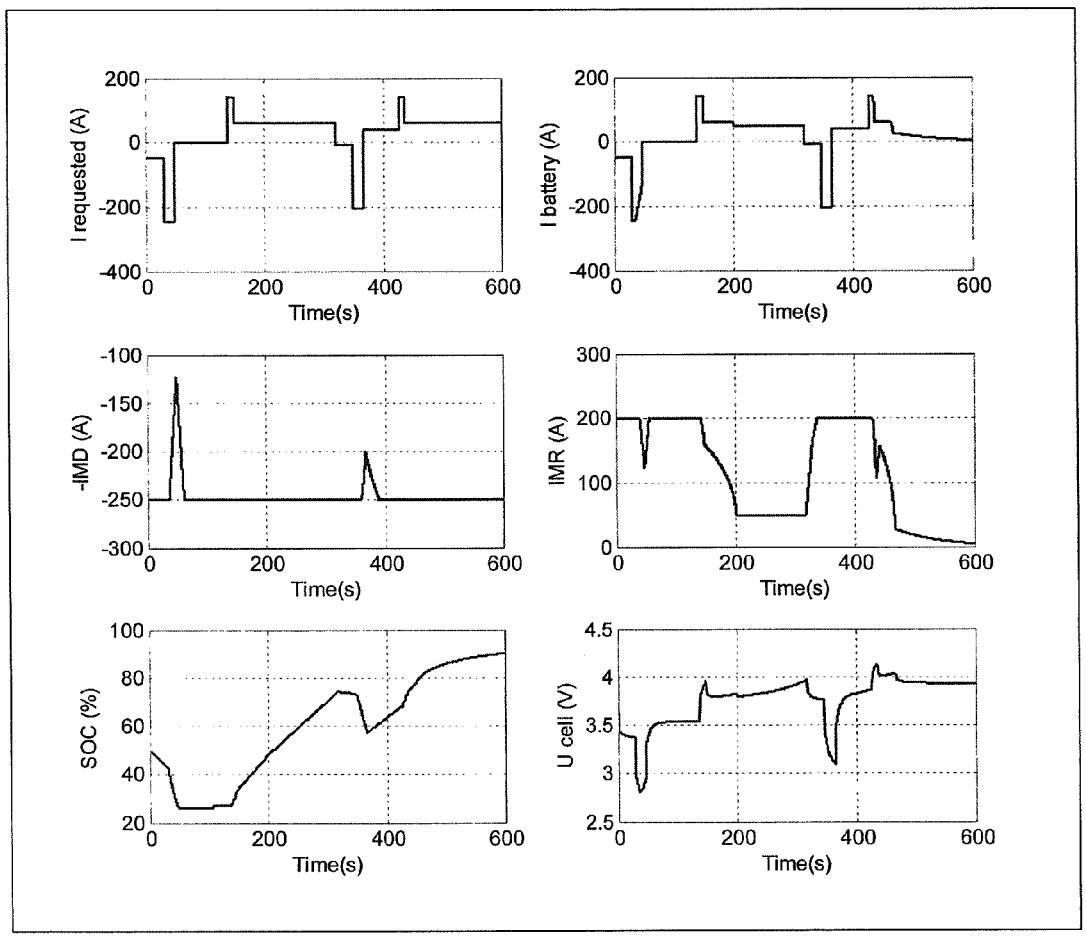
FIG. 8 shows behavior curves of a battery according to the invention during operation.

Furthermore, graphs of FIG. 8 show behavior curves of a battery according to the invention during operation including charge and discharge cycles. It can be seen that discharge or charge pulses are authorized within limits and that the maximum charge voltage Vmax of the battery remains less than a maximum value of 4,1V. It can also be seen that when the SOC reaches 80% the maximum charge voltage remains less than the end of charge voltage of 4,0V; overcharging is thereby avoided.

The method of the invention thus makes it possible to increase the available power of the battery for hybrid applications and allow fast recharge whenever possible.

The above description of the invention is intended to be illustrative and not limiting. Various changes or modifications in the embodiments described may occur to those skilled in the art without departing from the spirit or scope of the invention.

For example, the invention was described with reference to Li-Ion batteries because the problem of charge current is critical for this type of battery. However, the invention is not limited to Li-Ion batteries but could be used for any other type of secondary batteries having electrochemical cells such as Li-Ton-Polymer batteries or Nickel-Metal-Hydride batteries.

Further, the method to manage discharge according to the invention could also apply to non rechargeable batteries.

The invention claimed is:

1. A method to manage charge of a rechargeable battery comprising at least one electrochemical cell having a predetermined maximum continuous charge current (IMR_C) allowed for given temperature and state of charge conditions, the method comprising the steps of:
   measuring in real time the battery current (I);
   comparing in real time the battery current (I) to the predetermined maximum continuous charge current (IMR_C);
   calculating dynamically an overcharge capacity (Cap),
   wherein the value of said overcharge capacity is increased whenever the battery current is less than the predetermined maximum continuous charge current (I<IMR_C), and
   wherein the value of said overcharge capacity is decreased whenever the battery current is more than the predetermined maximum continuous charge current (I>IMR_C);
   determining in real time a value for an instantaneous maximum current allowed in charge (IMR) as a function of the calculated overcharge capacity,
   wherein the instantaneous maximum current allowed in charge is equal to the predetermined maximum continuous charge current (IMR_out1=IMR_C) whenever the calculated overcharge capacity is less or equal to zero (Cap≦0), and
   wherein the instantaneous maximum current allowed in charge is more than the predetermined maximum continuous charge current (IMR_out1>IMR_C) whenever the calculated overcharge capacity is more than zero (Cap>0).

2. The method of claim 1, wherein as the overcharge capacity (Cap) is calculated as the time integral of the difference between the battery current and the maximum continuous charge current:

$$Cap=\int(I-IMR_c)dt$$

3. The method of claim 1, wherein the overcharge capacity (Cap) has a maximum value (Cap_max), for a given temperature and state of charge of the battery, defined as the overcharge capacity to allow a pulse charge current of more than the predetermined maximum continuous charge current during a given time without causing accelerated aging of the battery.

4. The method of claim 1, wherein the instantaneous maximum current allowed in charge (IMR) is decreased when the overcharge capacity (Cap) becomes less than a requested value (Cap_req) to allow decrease of the charge current to return to the maximum continuous charge current (IMR_C) with a maximum slope (Islope).

5. The method of claim 1, wherein the instantaneous maximum current allowed in charge (IMR) has a maximum value (IMR_max) defined as a function of a predetermined maximum charge voltage (Vmax) of the battery.

6. The method of claim 1, wherein the instantaneous maximum current allowed in charge (IMR) has a maximum value (IMR_max) comprised between 1.5 to 5 times the predetermined maximum continuous charge current (IMR_C) allowed for given temperature and state of charge conditions.

7. The method of claim 5, wherein the maximum value of the instantaneous maximum current allowed in charge (IMR_max) is reduced when the state of charge (SOC) of the battery increases.

8. The method of claim 1, the battery having a predetermined current allowed in continuous solicitation in charge (IM_therm_nom), the method further comprising the steps of:
calculating dynamically an over thermal capacity (Cap_Therm),
wherein the value of said over thermal capacity is increased whenever the battery current is less than the root mean square current allowed in continuous solicitation in charge (I<√IM_therm_nom), and
wherein the value of said over thermal capacity is decreased whenever the battery current is more than the root mean square current allowed in continuous solicitation in charge (I>√IM_therm_nom);
determining in real time a second value for the instantaneous maximum current allowed in charge (IM_therm_out) as a function of the calculated over thermal capacity,
wherein said second value of the maximum current allowed in charge is equal to the root mean square of the predetermined current allowed in continuous solicitation in charge (IM_therm_out =√IM_therm_nom) whenever the calculated over thermal capacity is less or equal to zero (Cap_Therm≦0), and
wherein said second value of the maximum current allowed in charge is more than the root mean square of the predetermined current allowed in continuous solicitation in charge (IM_therm_out >√IM_therm_nom) whenever the calculated over thermal capacity is more than zero (Cap_Therm>0)
determining an instantaneous maximum current allowed in charge (IMR_out) as the minimum in real time of the value determined as a function of the calculated overcharge capacity and of the value determined as a function of the calculated over thermal capacity (IMR_out=Min[IM_therm_out; IMR_out1]).

9. The method of claim 8, wherein the over thermal capacity (Cap_Therm) is calculated as the time integral of the difference between the square of the instantaneous charge current and the square of the predetermined maximum continuous charge current, $$Cap\_Therm = \int (I^2 - IMR_C^2) dt$$

or as the time integral of the square of the difference between the instantaneous charge current and the maximum continuous charge current, $$Cap\_Therm = \int (I - IMR_C)^2 dt.$$

10. The method of claim 9, wherein the over thermal capacity (Cap_Therm) is a function of the battery resistance.

11. A method to manage discharge of a battery comprising at least one electrochemical cell having a predetermined maximum continuous discharge current (IMD_C) allowed for given temperature and state of charge conditions, the method comprising the steps of:
measuring in real time the battery current (I);
comparing in real time the battery current (I) to the predetermined maximum continuous discharge current (IMD_C);
calculating dynamically an over thermal capacity (CapTh),
wherein the value of said over thermal capacity is increased whenever the battery current is less than the predetermined maximum continuous discharge current (I<IMD_C), and
wherein the value of said over thermal capacity is decreased whenever the battery current is more than the predetermined maximum continuous discharge current (I>IMD_C);
determining in real time an instantaneous maximum current allowed in discharge (IMD_max) as a function of the calculated over thermal capacity,
wherein the maximum current allowed in discharge is equal to the predetermined maximum continuous discharge current (IMD_max=IMD_C) whenever the calculated over thermal capacity is less or equal to zero (CapTh≦0), and
wherein the maximum current allowed in discharge is more than the predetermined maximum continuous discharge current (IMD_max>IMD_C) whenever the calculated over thermal capacity is more than zero (CapTh>0).

12. The method of claim 11, wherein the over thermal capacity is calculated as the time integral of the difference between the square of the battery current and the square of the maximum continuous current allowed in discharge, $$CapTh = \int (I^2 - IMD_C^2) dt$$

or as the time integral of the square of the difference between the instantaneous discharge current and the maximum continuous current allowed in discharge, $$CapTh = \int (I - IMD_C)^2 dt.$$

13. The method of claim 12, wherein the over thermal capacity (CapTh) is a function of the battery resistance.

14. The method of claim 11, wherein the over thermal capacity (CapTh) has a maximum value (CapTh_max), for a given temperature and state of charge of the battery, defined as the over thermal capacity to allow a pulse discharge current of more than the predetermined maximum continuous discharge current during a given time without damaging the electrochemical cell by overheating.

15. The method of claim 11, wherein the instantaneous maximum current allowed in discharge (IMD) is decreased when the over thermal capacity (CapTh) becomes less than a requested value (CapTh_req) to allow decrease of the discharge current to return to the maximum continuous discharge current (IMD_C) with a maximum slope (Islope).

16. The method of claim 11, wherein the instantaneous maximum current allowed in discharge (IMD) has a maximum absolute value (IMD_max) defined as a function of a predetermined minimum discharge voltage (Vmin) of the battery.

17. The method of claim 16, wherein the maximum value of the instantaneous maximum current allowed in discharge (IMD_max) is reduced when the state of charge (SOC) of the battery decreases.

18. The method of claim 11, wherein the instantaneous maximum current allowed in discharge (IMD) has a maximum absolute value (IMD_max) comprised between 1.5 to 4 times the predetermined maximum continuous discharge current (IMD_C) allowed for given temperature and state of charge conditions.

19. A controller comprising a memory including a program that manages charge of a rechargeable battery comprising at least one electrochemical cell having a predetermined maximum continuous charge current allowed for given temperature and state of charge conditions, the program of the controller implementing the steps of:
measuring in real time the battery current;
comparing in real time the battery current to the predetermined maximum continuous charge current;
calculating dynamically an overcharge capacity,
wherein the value of said overcharge capacity is increased whenever the battery current is less than the predetermined maximum continuous charge current, and
wherein the value of said overcharge capacity is decreased whenever the battery current is more than the predetermined maximum continuous charge current;
determining in real time a first value of an instantaneous maximum current allowed in charge as a function of the calculated overcharge capacity,
wherein the first value of instantaneous maximum current allowed in charge is equal to the predetermined maximum continuous charge current whenever the calculated overcharge capacity is less or equal to zero, and
wherein the first value of instantaneous maximum current allowed in charge is more than the predetermined maximum continuous charge current whenever the calculated overcharge capacity is more than zero,
wherein the controller limits in real time or provides information allowing to limit in real time the battery current to the determined first value of the maximum current allowed in charge.

20. A battery comprising at least one electrochemical cell, and a charge controller according to claim 19.

21. The battery of claim 20 being a Li-Ion battery.

22. A controller comprising a memory including a program that manages discharge of a rechargeable battery comprising at least one electrochemical cell having a predetermined maximum continuous discharge current (IMD_C) allowed for given temperature and state of charge conditions, the program of the controller implementing the steps of:
measuring in real time the battery current;
comparing in real time the battery current to the predetermined maximum continuous discharge current;
calculating dynamically an over thermal capacity,
wherein the value of said over thermal capacity is increased whenever the battery current is less than the predetermined maximum continuous discharge current, and
wherein the value of said over thermal capacity is decreased whenever the battery current is more than the predetermined maximum continuous discharge current;
determining in real time an instantaneous maximum current allowed in discharge as a function of the calculated over thermal capacity,
wherein the maximum current allowed in discharge is equal to the predetermined maximum continuous discharge current whenever the calculated over thermal capacity is less or equal to zero, and
wherein the maximum current allowed in discharge is more than the predetermined maximum continuous discharge current whenever the calculated over thermal capacity is more than zero,
wherein the controller limits in real time or provides information allowing to limit in real time the battery current to the determined value of the maximum current allowed in discharge.

23. A battery comprising at least one electrochemical cell, and a discharge controller according to claim 22.

24. The battery of claim 23 being a Li-Ion battery.

* * * * *